United States Patent
Tichborne et al.

(10) Patent No.: US 9,016,301 B2
(45) Date of Patent: Apr. 28, 2015

(54) CONDUIT PROTECTION SYSTEM AND METHOD

(75) Inventors: Franklin Tichborne, Bristol (GB); Joseph K-W Lam, Bristol (GB); Simon Masters, Bristol (GB); David Parmenter, Uckfield (GB)

(73) Assignee: Airbus Operations Limited, Bristol (GB)

( * ) Notice: Subject to any disclaimer, the term of this patent is extended or adjusted under 35 U.S.C. 154(b) by 411 days.

(21) Appl. No.: 13/426,780

(22) Filed: Mar. 22, 2012

(65) Prior Publication Data

US 2012/0248251 A1  Oct. 4, 2012

(30) Foreign Application Priority Data

Mar. 30, 2011 (GB) .................................. 1105340.2

(51) Int. Cl.
   F16K 17/00 (2006.01)
   G01M 3/18 (2006.01)
   G01M 3/26 (2006.01)

(52) U.S. Cl.
   CPC .. G01M 3/18 (2013.01); G01M 3/26 (2013.01)

(58) Field of Classification Search
   USPC ........... 137/68.11, 68.14, 68.18, 71; 138/104, 138/114; 244/128, 135 R
   See application file for complete search history.

(56) References Cited

U.S. PATENT DOCUMENTS

| 2,413,087 | A | * | 12/1946 | Urbany ............................ 169/61 |
| 2,608,205 | A | * | 8/1952 | Proctor ........................... 137/375 |
| 3,512,556 | A | * | 5/1970 | McKhann ........................ 137/71 |
| 4,100,932 | A | | 7/1978 | Schmitz |
| 4,913,380 | A | * | 4/1990 | Vardaman et al. ......... 244/135 R |
| 5,357,998 | A | * | 10/1994 | Abrams ...................... 137/68.11 |
| 5,709,239 | A | | 1/1998 | Macalello et al. |
| 8,038,094 | B2 | * | 10/2011 | Oyama ......................... 244/99.6 |
| 8,118,049 | B2 | * | 2/2012 | Cardona et al. ................. 137/69 |
| 2003/0168219 | A1 | | 9/2003 | Sloan |
| 2004/0031523 | A1 | | 2/2004 | Zeng |
| 2005/0151019 | A1 | * | 7/2005 | Stevens ..................... 244/135 R |
| 2007/0074759 | A1 | | 4/2007 | McClung, Jr. |
| 2009/0090724 | A1 | * | 4/2009 | Childress et al. ......... 220/560.01 |
| 2009/0212162 | A1 | * | 8/2009 | Ward ........................ 244/135 R |

(Continued)

FOREIGN PATENT DOCUMENTS

| CN | 1601164 A | 3/2005 |
| CN | 201016404 Y | 2/2008 |
| DE | 19749279 A1 | 5/1999 |

(Continued)

OTHER PUBLICATIONS

Search Report for GB 1105340.2 dated Jul. 20, 2011.

*Primary Examiner* — John K Fristoe, Jr.
*Assistant Examiner* — Minh Le
(74) *Attorney, Agent, or Firm* — Lowe Hauptman & Ham, LLP

(57) ABSTRACT

A conduit protection system, comprising: a conduit for carrying a fluid; a sealed vessel surrounding the conduit along a protected zone of the conduit; and a valve moveable between a first position for obstructing fluid flow through the protected zone of the conduit and a second position for enabling fluid flow through the protected zone of the conduit, wherein the valve is biased to the first position, and wherein the valve is fluidically coupled to the sealed vessel such that a positive pressure within the sealed vessel is operable to move the valve to the second position against the bias. Also, a method for protecting a fluid carrying conduit.

18 Claims, 5 Drawing Sheets

(56) References Cited

U.S. PATENT DOCUMENTS

2009/0242694 A1* 10/2009 Oyama ........................ 244/99.6
2010/0051749 A1* 3/2010 Tanner ...................... 244/135 R
2011/0284694 A1* 11/2011 Yamaguchi et al. ...... 244/135 R

FOREIGN PATENT DOCUMENTS

| DE | 202006016391 U1 | 2/2007 |
| JP | 59217100 A | 12/1984 |
| WO | 2007044346 A2 | 4/2007 |

* cited by examiner

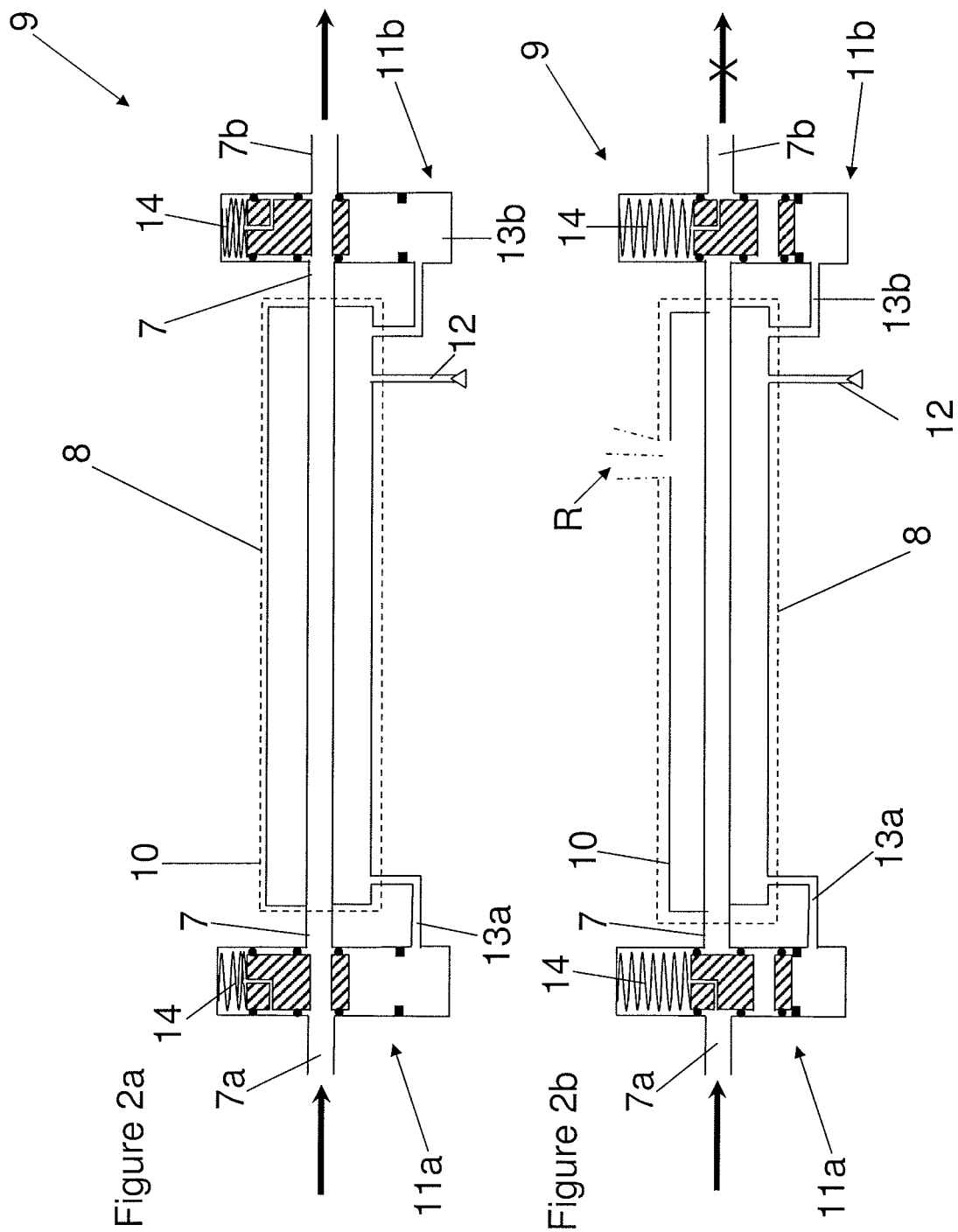

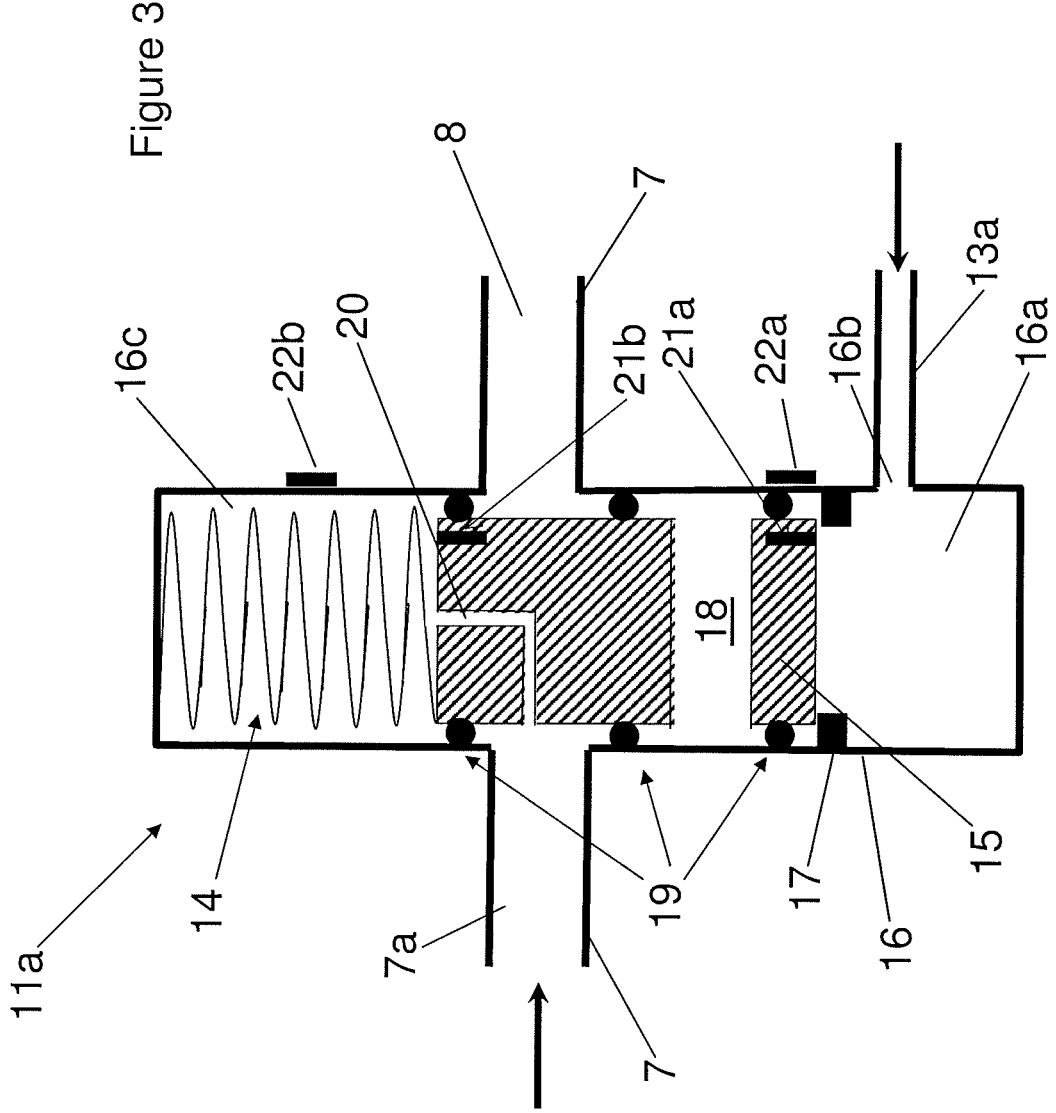

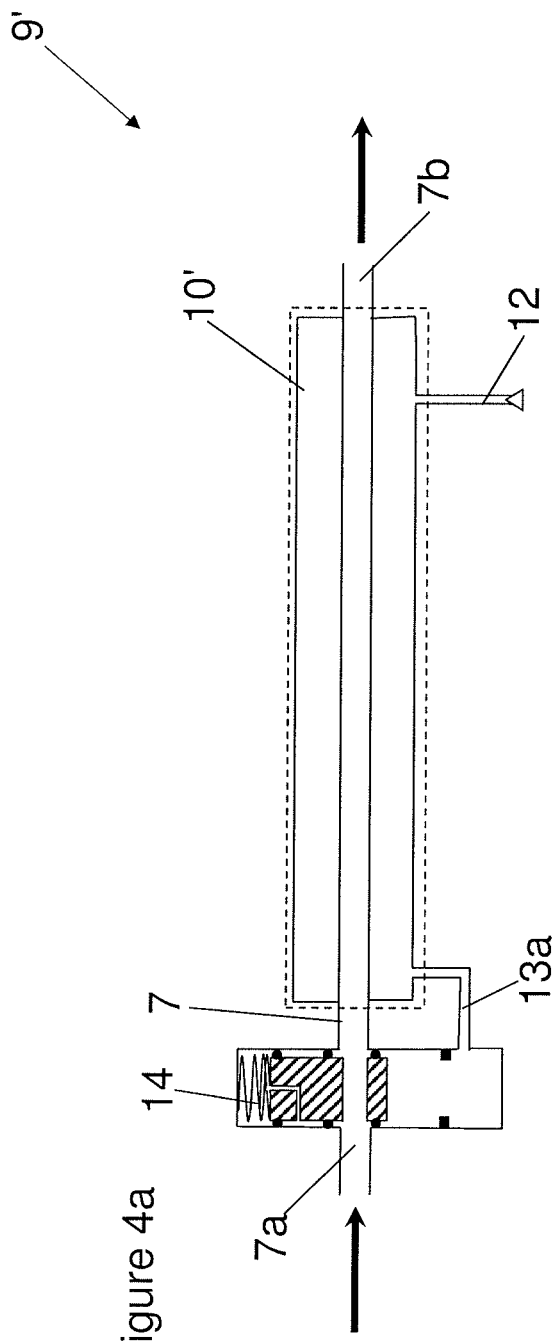
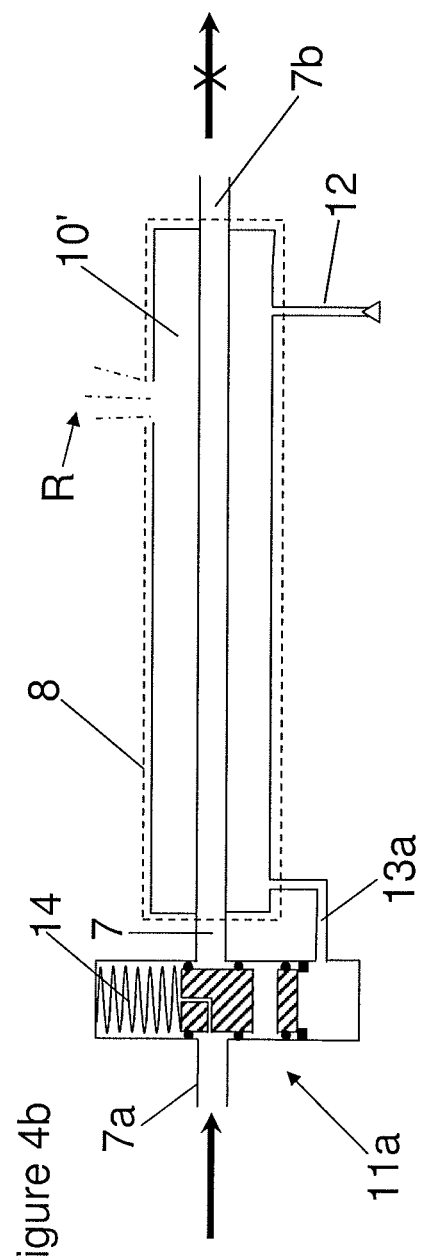
Figure 4a
Figure 4b

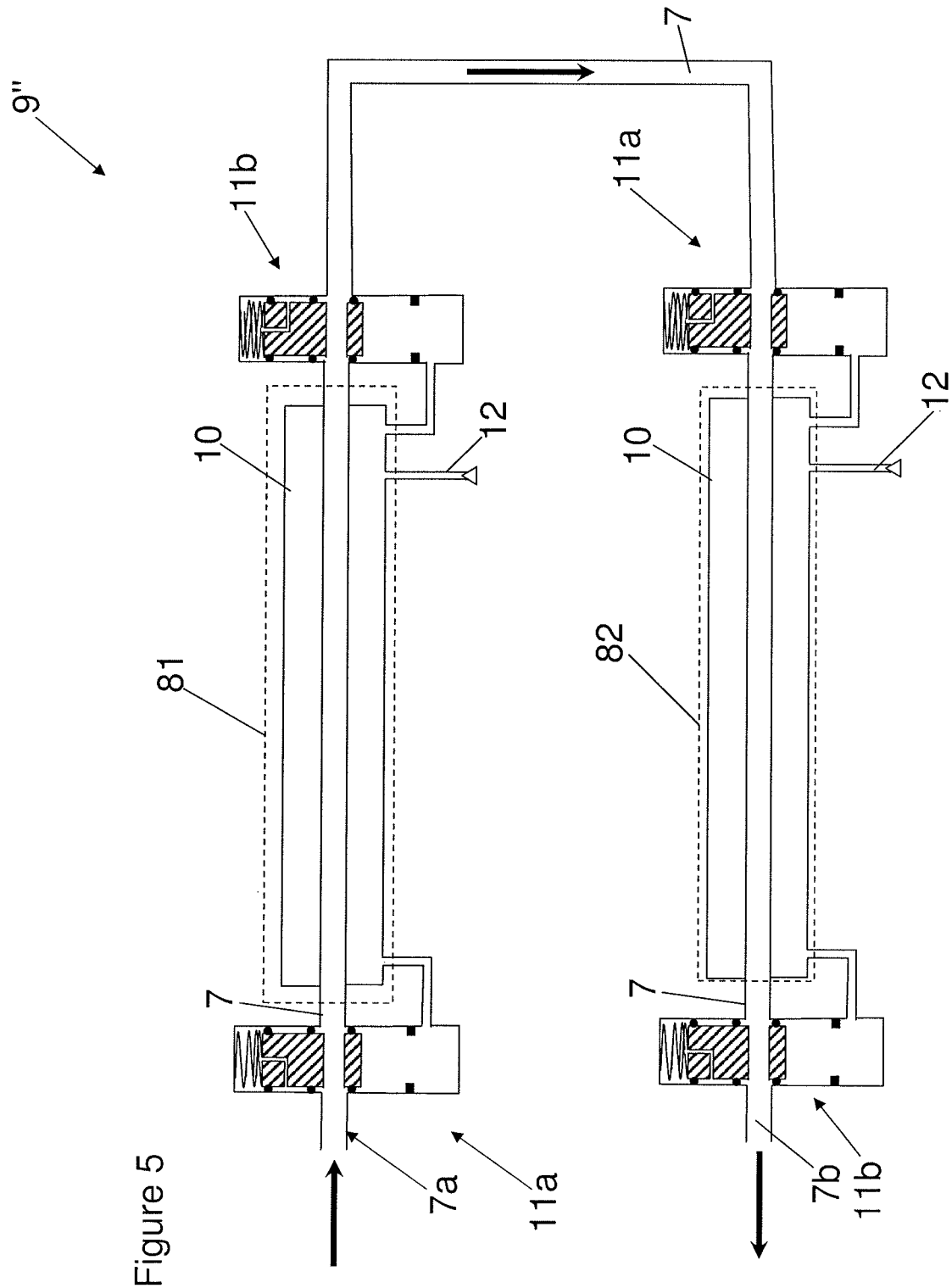

CONDUIT PROTECTION SYSTEM AND METHOD

RELATED APPLICATIONS

The present application is based on, and claims priority from, British Application Number 1105340.2, filed Mar. 30, 2011, the disclosure of which is hereby incorporated by reference herein in its entirety.

FIELD OF THE INVENTION

The present invention relates to a conduit protection system and corresponding method for protecting a zone of a fluid carrying conduit.

BACKGROUND OF THE INVENTION

Conduits, such as pipes, hoses, pipelines, etc., adapted to convey fluids (liquids and gases) can be susceptible to rupture and leakage.

On aircraft, fuel pipes need to be protected against rupture and leaks, in particular when they traverse parts of the aircraft which may include ignition sources. A system is needed to quickly isolate those pipes so that any resultant fire is not fed by more fuel, and can be extinguished either by active means and/or fuel starvation.

This is particularly important where pipes traverse engine rotor burst zones. Typically on modern aircraft, essential services such as harnesses, hydraulic lines and fuel pipes are ensured by running them diversely such that any rotor burst event resulting in a release of material with high energy will not have a trajectory through both prime and redundant services. However this does not stop the release of fluids, fuel or gases from one of the ruptured lines, and those lines need to be isolated as quickly as possible.

It has been proposed that future aircraft may make use of hydrogen fuel cell technology. The hydrogen fuel tank is proposed to be in the tail of the aircraft and the fuel cell is proposed to be forward of that, and with the option of rear engines, the hydrogen carrying fuel pipes could traverse those engine's rotor burst zones.

In the field of oil and gas extraction and transportation, or any other environment where highly flammable or explosive fluids are transported via pipelines, a system is needed to halt the flow of fluids through the pipeline in the event of a potentially catastrophic failure.

SUMMARY OF THE INVENTION

A first aspect of the invention provides a conduit protection system, comprising: a conduit for carrying a fluid; a sealed vessel surrounding the conduit along a protected zone of the conduit; and a valve moveable between a first position for obstructing fluid flow through the protected zone of the conduit and a second position for enabling fluid flow through the protected zone of the conduit, wherein the valve is biased to the first position, and wherein the valve is fluidically coupled to the sealed vessel such that a positive pressure within the sealed vessel is operable to move the valve to the second position against the bias.

A further aspect of the invention provides a method for protecting a fluid carrying conduit, comprising: providing a sealed vessel surrounding the conduit along a protected zone of the conduit; providing a valve moveable between a first position for obstructing fluid flow through the protected zone of the conduit and a second position for enabling fluid flow through the protected zone of the conduit; biasing the valve to the first position; fluidically coupling the valve to the sealed vessel; and applying a positive pressure within the sealed vessel to move the valve to the second position against the bias.

The invention is advantageous in that the conduit protection system provides a failsafe solution to isolate the protected zone of the conduit in the event of any system failure. In the event that the positive pressure intended to be applied to the sealed vessel should fall for any reason, the valve will to move under bias to the first position so as to obstruct fluid flow through the protected zone of the conduit. For example, the failure may be due to an inadvertent leak from the outside of the sealed vessel.

If the sealed vessel is intended to be maintained at a higher pressure than that within the conduit then the conduit protection system will also move the valve to the second position in the event of a rupture in the protected zone of the conduit.

The valve may include a valve body moveable within a valve chamber.

A first portion of the valve chamber on one side of the valve body may be fluidically coupled to the sealed vessel.

The valve body may be biased to the first position by a spring. Alternatively, any other suitable failsafe biasing means may be used.

The spring may be housed within a second portion of the valve chamber on the opposite side of the valve body to the first portion.

A pressure relief channel may be formed through the valve body adapted to fluidically couple the second portion of the valve chamber to the conduit when the valve is in the first position. The relief valve acts to ensure that the valve can move to the second position without hydraulic resistance.

The valve may include a seat, and the valve body may be biased against the seat when in the first position. The seat limits the travel of the valve body within the valve chamber so as not to obstruct the fluid connection to the sealed vessel.

The valve body may include an aperture for enabling fluid flow through the aperture when the valve body is in the second position.

The aperture may be aligned with the conduit when the valve body is in the second position.

The valve may include one or more seal members for sealing between the valve body and the valve chamber. The seal members may be, for example, O-ring type seals.

The valve may include at least one seal member on either side of the conduit when the valve is in the first position, and at least one seal member on either side of the conduit when the valve is in the second position.

The valve may include a valve position sensor. The position sensor may be a non-intrusive sensor, which indicates when the valve is open/closed. This sensor may take the form of a magnet embedded in the moving valve body wall, and a reed switch embedded in the valve chamber wall, for example. The valve position indicator may be displayed visually, audibly or by any other means at the valve location or at a location remote from the valve so that appropriate action may be taken.

The positive pressure applied within the sealed vessel may be greater than ambient pressure. Maintaining the pressure within the sealed vessel above ambient (i.e. the pressure external to the protected conduit) ensures that in the event of a rupture in the vessel wall, the positive pressure in the vessel will not be maintained and so the valve will automatically close.

The positive pressure applied within the sealed vessel may be greater than a pressure within the conduit. Maintaining the pressure within the sealed vessel above the pressure within the conduit ensures that in the event of a rupture in the protected zone of the conduit, the positive pressure in the vessel will not be maintained and so the valve will automatically close. If the conduit were to carry a fluid at a high pressure that is substantially the same as the vessel pressure then such a rupture may not be detectable. Such a scenario is therefore preferably avoided by maintaining the vessel pressure greater than the conduit pressure.

The positive pressure within the sealed vessel may be applied by priming the vessel with an inert gas.

The system may comprise a plurality of the valves.

For example, the sealed vessel may be fluidically coupled to at least two of the valves, with at least one of the valves being disposed on either side of the protected zone. Isolating the protected zone of the conduit at both ends improves the level of protection afforded by the system.

Alternatively, the system may comprise a plurality of the sealed vessels each associated with a respective different protected zone of the conduit, and each associated with at least one of the valves for selectively obstructing fluid flow through the respective protected zone of the conduit. Providing a plurality of protected zones is particularly beneficial in the case of a long conduit.

A further aspect of the invention provides an aircraft comprising a rotary engine and defining a rotor burst zone, and a conduit protection system according to the first aspect, wherein the protected zone of the conduit passes through the rotor burst zone.

The conduit may be any fluid (liquid or gas) pipelines, such as a fuel line, for example. The conduit may be adapted to convey fuel between a fuel tank and a fuel cell, for example.

BRIEF DESCRIPTION OF THE DRAWINGS

Embodiments of the invention will now be described with reference to the accompanying drawings, in which:

FIG. 2a illustrates a conduit protection system for the fuel line under normal operating conditions, and FIG. 2b illustrates the conduit protection system in the event of a rupture;

FIG. 3 illustrates in detail a valve arrangement used in the conduit protection system;

FIG. 4a illustrates an alternative embodiment of a conduit protection system for protecting a zone of a conduit under normal operating conditions, and FIG. 4b illustrates the protection system in the event of a rupture; and FIG. 5 illustrates a further alternative embodiment of a conduit protection system under normal operating conditions for protecting multiple zones of a conduit.

DETAILED DESCRIPTION OF EMBODIMENT(S)

Figure 1:
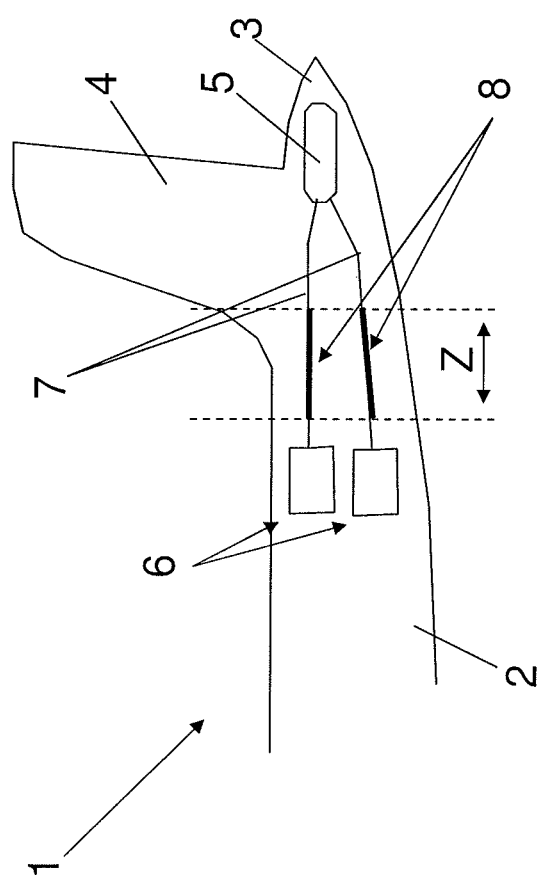
FIG. 1 illustrates an aircraft having fuel lines connected between a hydrogen fuel tank and fuel cells, in which the fuel lines include a protected zone that passes through a rotor burst zone of one or more rear mounted engines.

FIG. 1 illustrates an aircraft 1 having a fuselage 2, a tail 3, a tailplane 4, a hydrogen fuel tank 5 mounted in the tail 3, hydrogen fuel cells 6 positioned forward of the hydrogen tank 5, and hydrogen fuel lines 7 connected between the hydrogen tank 5 and the fuel cells 6. The aircraft 1 has rear mounted rotary engines (not shown) defining a rotor burst zone Z towards the rear of the aircraft 1. The hydrogen fuel lines 7 pass through the rotor burst zone Z. The portion of the fuel lines 7 which pass through the rotor burst zone Z define a zone 8 which requires protection.

FIG. 2 illustrates a conduit protection system 9 for enabling the protected zone 8 of the fuel line 7. FIG. 2a illustrates the conduit protection system 9 under normal operating conditions in an "open" state, and FIG. 2b illustrates the conduit protection system 9 in a "closed" state for isolating the protected zone 8 of the fuel line 7.

The fuel line 7 has an input 7a, an output 7b, and a sealed vessel 10 surrounding the fuel line 7 along the length of the protected zone 8. The sealed vessel 10 surrounding the fuel line 7 forms a double-walled pipe, with the fuel line 7 defining an inner wall of the pipe and the vessel 10 defining an outer wall of the pipe. An inlet valve 11a is disposed between the inlet 7a and the protected zone 8, and an outlet valve 11b is disposed between the protected zone 8 and the outlet 7b. The valves 11a, 11b are essentially identical. The construction of the valve 11a will be described in detail below with reference to FIG. 3.

The sealed vessel 10 has a one time pressurisation point 12 and the volume within the sealed vessel 10 is primed with a pressurised inert gas. The volume within the sealed vessel 10 is maintained at a pressure greater than the ambient pressure external to the conduit protection system 9. The sealed vessel 10 is fluidically connected via respective fluid paths 13a, 13b to the respective valves 11a, 11b.

The valves 11a, 11b are designed as "failsafe" so that if no pressure is applied to open them they close automatically by means of a spring 14. Once the sealed vessel 10 has been primed with pressurised inert gas the pressurised valves 11a, 11b move to their open position as shown in FIG. 2a. When the valves 11a, 11b are open fluid is permitted to pass through the protected zone 8 along the fuel line 7. In the event that the pressure within the sealed vessel 10 falls for any reason the pressure will cease to maintain the valves 11a, 11b in their open position and the valves will automatically close under the action of spring 14, as shown in FIG. 2b.

Any failure in the conduit protection system 9, such as a rupture of the vessel 10 (as shown in FIG. 2b by rupture R) will cause the valves 11a, 11b to close and will isolate the protected zone 8 of the fuel line 7. The valves 11a, 11b will also close if there is a rupture in the wall of the fuel line within the protected zone provided that the fuel line 7 is carrying a fluid at a lower pressure than the pressure that is normally maintained within the sealed vessel 10.

FIG. 3 illustrates the inlet valve 11a in detail. The valve includes a valve body 15 moveable within a valve chamber 16. The valve chamber includes a first portion 16a on one side of the valve body 15. The first portion 16a of the valve chamber 16 has an aperture 16b connected to the fluid path 13a, which connects the first portion 16a of the valve chamber 16 to the pressurised volume within the sealed vessel 10.

The valve 11a is movable between a first "closed" position for obstructing fluid flow through the protected zone 8 of the fuel line 7, and a second "open" position for enabling fluid flow through the protected zone 8 of the fuel line 7. In FIG. 3, the valve 11a is shown in the first "closed" position. The valve is biased to the first position by spring 14. The spring 14 is housed within a second portion 16c of the valve chamber 16 on the opposite side of the valve body 15 to the first portion 16a. The spring 14 contacts one side of the valve body 15 so as to bias the valve body 15 to its first, normally closed, position.

The first portion 16a of the valve chamber 16 includes a valve seat 17 for limiting the travel of the valve body 15 within the valve chamber 16 under the action of spring 14, and in so doing defines the first "closed" position of the valve.

The valve body 15 includes an aperture 18 therethrough for enabling fluid flow through the aperture 18 when the valve body 15 is in the second "open" position. When the sealed vessel 10 is primed with pressurised inert gas the first portion 16a of the valve chamber 16 is pressurised so as to move the valve body 15 to the second position against the biasing action of spring 14. In the second position, the aperture 18 is aligned with the fuel line 7 so as to enable fluid to pass along fuel line 7 through the valve 11a.

The valve 11a includes three gas-tight O-ring seals 19 between the valve body 15 and the valve chamber 16 for sealing the valve body 15 with respect to the valve chamber 16. The O-ring seals 19 are disposed such that when the valve is in the first position at least one of the O-ring seals 19 is disposed on either side of the fuel line 7, and such that when the valve is in the second position at least one of the O-ring seals 19 is disposed on either side of the fuel line 7. The O-ring seals 19 therefore additionally seal the fuel line 7 with respect to the valve chamber 16.

The valve body 15 includes a pressure relief channel 20 connected between the inlet 7a of the fuel line 7 and the second portion 16c of the valve chamber 16 when the valve is in the first "closed" position. The pressure relief channel 20 is operable to equalise pressures so as to enable the valve to move from the second "open" position to the first "closed" position with minimal hydraulic resistance. This enables rapid closing of the valve.

The valve 11a includes a non-intrusive sensor which indicates the position of the valve. The sensor includes magnets 21a, 21b and magnetic proximity sensors 22a, 22b. The magnets 21a, 21b are embedded in the moveable valve body 15 and the proximity sensors 22a, 22b, which may take the form of a reed switch, for example, are disposed either external to the valve chamber 16 or are embedded in the valve chamber wall. The magnet 21a is disposed at one end of the valve body 15 nearest the seat 17 and the magnet 21b is disposed at the opposite end of the valve body 15 nearest the spring 14. The magnetic proximity sensor 22a is disposed adjacent the valve seat 17 and the magnetic proximity sensor 22b is disposed adjacent the spring 14.

The magnet and sensor combination 21a, 22a is adapted to sense when the valve is in the first "closed" position and the magnet and sensor combination 21b, 22b, is adapted to sense when the valve is in the second "open" position. The valve position sensor may be used to indicate visually, audibly or by any other means the position of the valve 11a to one or more interested parties, such as the pilot of the aircraft 1 or a maintenance engineer. It will be appreciated that any other type of proximity sensor may alternatively be used for this purpose.

Returning to FIGS. 2a and 2b it can be seen that the output valve 11b is substantially identical in construction to the input valve 11a. The only difference is the way in which the inlet valve 11a and the outlet valve 11b are connected to the fuel line 7. The protected zone 8 of the fuel line 7 is connected on the side of the valve 11a, 11b opposite the opening in the pressure relief channel 20.

Whilst in FIG. 2 the conduit protection system 9 is shown as having a valve on either side of the protected zone 8, if there is no possible hazard, e.g. a reservoir or flammable fluid, from the outlet end 7b then the outlet valve 11b may be omitted.

FIGS. 4a and 4b illustrate an alternative embodiment of the conduit protection system 9', which is identical to the conduit protection system 9 shown in FIG. 2 with the exception that the outlet valve 11b and the connection 13b has been omitted. Like reference numerals are used in FIG. 4a to denote like parts in FIGS. 2 and 3. FIG. 4a shows the inlet valve 11a in the second "open" position and FIG. 4b illustrates the valve 11a in the first "closed" position.

FIG. 5 illustrates a further alternative embodiment of the conduit protection system 9" in which the fuel line 7 includes a first protected zone 81 and a second protected zone 82. Each of the protected zones 81, 82 are associated with a respective sealed vessel 10, a respective inlet valve 11a and a respective outlet valve 11b. The structure and function of the conduit protection system components is identical to that described previously and like reference numerals have been used to denote like parts with FIGS. 2 and 3.

In FIG. 5, the conduit protection system 9" is shown with all of the valves 11a, 11b in the second "open" position. The protected zones 81, 82 are operable independently but could be operated collectively if the sealed vessel 10 of the first protected zone 81 is fluidically coupled to the sealed vessel 10 of the second protected zone 82.

It will be appreciated that any number of valves may be associated with each protected zone, including one. It will also be appreciated that any fluid carrying conduit may be associated with any number of protected zones, including one.

The conduit protection system may be used to protect one or more zones of any fluid carrying conduit. For example, the system may be used to protect a conduit in any vehicle, such as an aircraft, automobile, truck, boat, etc., or in any fixed structure such as an oil/gas rig or pipeline. The system may be used to protect against rupture of the conduit due to accident, mechanical failure or sabotage, for example. The system may also be used to protect against failure of a system connected to the conduit, such as a reservoir, storage tank, pump, engine, which may have adverse consequences should the flow of fluid within the conduit not be halted automatically by the system.

Although the invention has been described above with reference to one or more preferred embodiments, it will be appreciated that various changes or modifications may be made without departing from the scope of the invention as defined in the appended claims.

The invention claimed is:

1. A conduit protection system, comprising:
a conduit for carrying a fluid;
a sealed vessel surrounding the conduit along a protected zone of the conduit; and
a valve moveable between a first position for obstructing fluid flow through the protected zone of the conduit and a second position for enabling fluid flow through the protected zone of the conduit,
wherein the valve is biased to the first position, and wherein the valve is fluidically coupled to the sealed vessel such that a positive pressure within the sealed vessel is operable to move the valve to the second position against the bias,
wherein the valve includes a valve body moveable within a valve chamber, wherein a first portion of the valve chamber on one side of the valve body is fluidically coupled to the sealed vessel,
wherein the valve body is biased to the first position by a spring,
wherein the spring is housed within a second portion of the valve chamber on the opposite side of the valve body to the first portion, and
wherein the conduit protection system further comprises a pressure relief channel through the valve body adapted to fluidically couple the second portion of the valve chamber to the conduit when the valve is in the first position and to not fluidically couple the second portion of the valve chamber to the conduit when the valve is in the second position.

2. A system according to claim 1, wherein the valve includes a seat, and wherein the valve body is biased against the seat when in the first position.

3. A system according to claim 1, wherein the valve body includes an aperture for enabling fluid flow through the aperture when the valve body is in the second position.

4. A system according to claim 3, wherein the aperture is aligned with the conduit when the valve body is in the second position.

5. A system according to claim 1, wherein the valve includes one or more seal members for sealing between the valve body and the valve chamber.

6. A system according to claim 5, wherein the valve includes at least one seal member on either side of the conduit when the valve is in the first position, and at least one seal member on either side of the conduit when the valve is in the second position.

7. A system according to claim 1, wherein the valve includes a valve position sensor.

8. A system according to claim 1, wherein the positive pressure applied within the sealed vessel is greater than ambient pressure.

9. A system according to claim 1, wherein the positive pressure applied within the sealed vessel is greater than a pressure within the conduit.

10. A system according to claim 1, further comprising a plurality of the valves.

11. A system according to claim 10, wherein the sealed vessel is fluidically coupled to at least two of the valves, with at least one of the valves being disposed on either side of the protected zone.

12. A system according to claim 10, further comprising a plurality of the sealed vessels each associated with a respective different protected zone of the conduit, and each associated with at least one of the valves for selectively obstructing fluid flow through the respective protected zone of the conduit.

13. An aircraft comprising a rotary engine and defining a rotor burst zone, and a conduit protection system according to any preceding claim, wherein the protected zone of the conduit passes through the rotor burst zone.

14. An aircraft according to claim 13, wherein the conduit is a fuel line.

15. An aircraft according to claim 14, wherein the conduit is adapted to convey fuel between a fuel tank and a fuel cell.

16. A method for protecting a fluid carrying conduit, comprising:
   providing a sealed vessel surrounding the conduit along a protected zone of the conduit;
   providing a valve moveable between a first position for obstructing fluid flow through the protected zone of the conduit and a second position for enabling fluid flow through the protected zone of the conduit; wherein the valve includes a valve body moveable within a valve chamber, wherein a first portion of the valve chamber on one side of the valve body is fluidically coupled to the seal vessel;
   providing a spring and biasing the valve to the first position by said spring; wherein the spring is housed within a second portion of the valve chamber on the opposite side of the valve body to the first portion,
   fluidically coupling the valve to the sealed vessel;
   providing a pressure relief channel through the valve body adapted to fluidically couple the second portion of the valve chamber to the conduit when the valve is in the first position and to not fluidically couple the second portion of the valve chamber to the conduit when the valve is in the second position, and
   applying a positive pressure within the sealed vessel to move the valve to the second position against the spring bias.

17. A method according to claim 16, wherein, in the event that the positive pressure intended to be applied to the sealed vessel should fall for any reason, the valve will move under bias to the first position so as to obstruct fluid flow through the protected zone of the conduit.

18. A method according to claim 16, wherein the step of applying a positive pressure within the sealed vessel includes priming the vessel with an inert gas.

* * * * *